Feb. 6, 1934.   W. V. HALL   1,945,855
GREASE GUN
Filed March 10, 1932
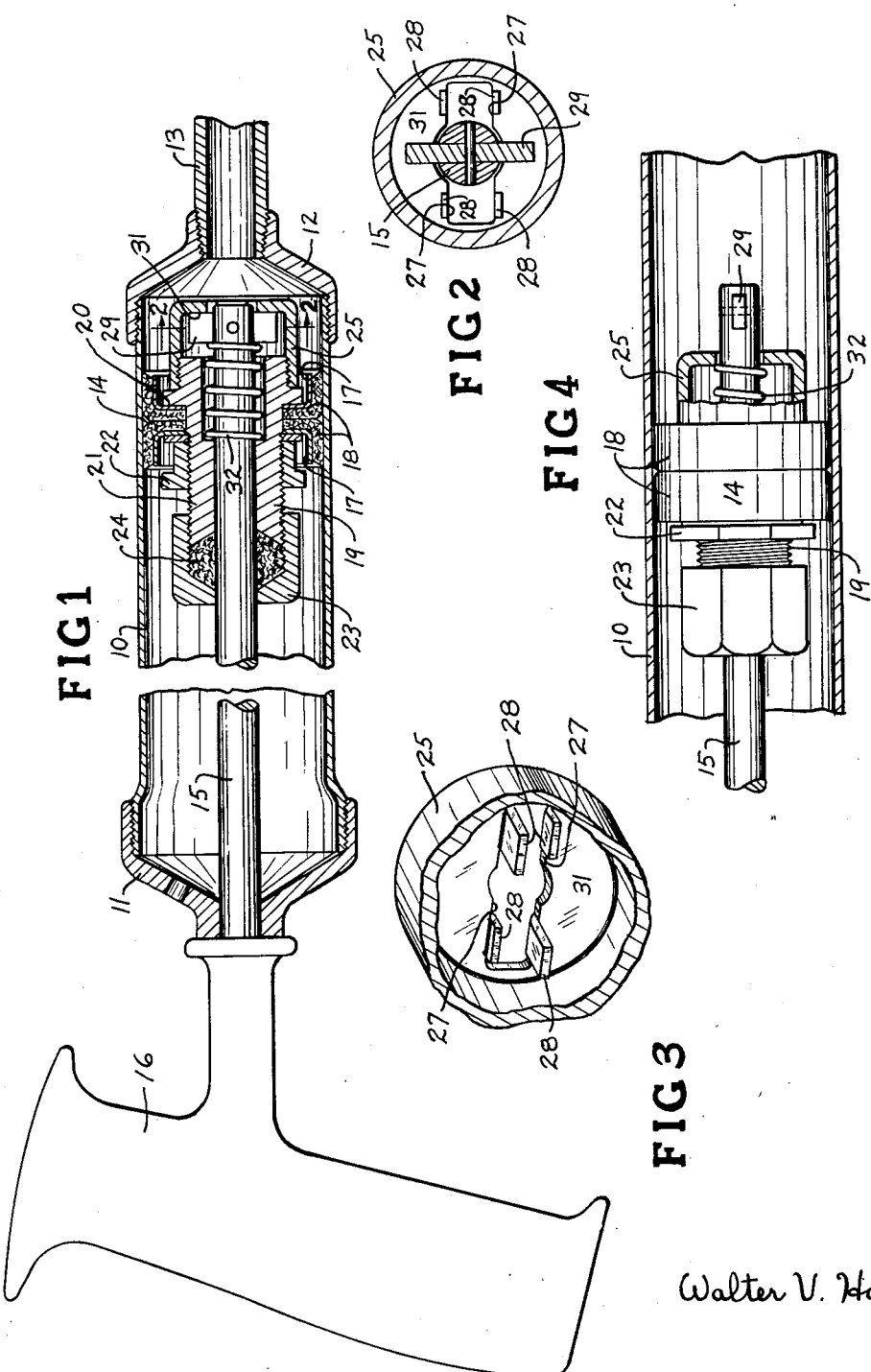
Inventor
Walter V. Hall
By Bates Goldrick & Teare
Attorneys Patented Feb. 6, 1934

1,945,855

UNITED STATES PATENT OFFICE 1,945,855

GREASE GUN

Walter V. Hall, Cleveland, Ohio, assignor to The United States Air Compressor Company, Cleveland, Ohio, a corporation of Ohio Application March 10, 1932. Serial No. 597,972

1 Claim. (Cl. 221—47.3)

This invention relates to an improvement in lubricant dispensing guns, particularly of the type in which the lubricant is forced from a cylinder by a hand-impelled piston travelling longitudinally of the cylinder. Lubricant dispensing guns of this type are often supported from a rack in certain definite prearranged positions. The nature of the support is such that the handle for operating the gun must be maintained in close proximity to the end of the cylinder when the gun is supported upon the rack. In many cases, however, the full contents of the cylinder are not dispensed when it is desired to return the gun to the rack. Thus, it is necessary for the operator to expel the remaining contents into a drum in order to return the plunger rod to the innermost position before placing the gun upon the rack. This procedure not only requires time, but necessitates additional time for refilling the gun when it is used again.

An object of the present invention is to provide a grease gun, wherein the plunger rod may, whenever desired, be forced entirely into the cylinder to its extreme innermost position without moving the piston with reference to the cylinder. Thus the handle may be moved in close proximity to the end of the cylinder to facilitate the positioning of the gun upon the rack. Furthermore, whenever subsequent use of the gun is desired, the handle may be withdrawn and connected to the piston in an expeditious manner for dispensing purposes.

My improvement comprises making a detachable connection for the plunger rod and the piston, and in the form illustrated it comprises a bayonet lock between the plunger rod and a cap which is carried by the piston. Other forms of mechanism may be used, however, without departing from the spirit of my invention.

In the drawing, Fig. 1 is a general sectional view of the gun; Fig. 2 is a section on the lines 2—2 of Fig. 1; Fig. 3 is an enlarged view of a portion of the bayonet locking device and Fig. 4 is a view partly in section showing the plunger rod disconnected from the piston.

I have illustrated my improvement as embodied in a grease gun having a cylinder 10, closed at one end by a cap 11, and having at the other end a spout 12 which may be provided with a discharge nozzle 13. A piston 14 is shown in close contact with the walls of the cylinder and as being adapted to be moved longitudinally therein by a plunger rod 15. The rod extends through the cap and terminates in a hand grip 16.

The piston is illustrated as comprising two cup-shaped members 17, placed back to back, and surrounded by two cup leathers 18, closely fitting the interior walls of the cylinder 10. These parts are assembled upon a hollow bolt 19, which is slidable upon the rod 15, and which has a shoulder 20, bearing against one side of the piston. The shank 21 of the bolt is threaded and is provided with a nut 22 that bears against the other side of the piston.

To prevent leakage of lubricant past the piston and along the plunger rod, a stuffing box may be provided. To this end I may use one end of the bolt 19 as a gland, and provide a packing nut or cap 23 which encloses packing 24.

For locking the plunger rod to the piston, I have shown a cap 25 which may be threaded onto the bolt. This cap is adapted to make a bayonet lock with the plunger rod, and to this end the cap may have a slot 27 therein and pairs of lugs 28 adjacent thereto. These lugs may be disposed on opposite sides of the axis of the cap and on opposite sides of the slot. The other member of the bayonet lock is represented as a flat key 29, which extends through the plunger rod and is rigidly attached thereto. When the parts are in a position to dispense lubricant, as is shown in Fig. 1, the key is urged against the inner face 31 of the cap under the influence of a spring 32, and extends transversely of the slot.

When it is desired to unlock the plunger rod from the piston, the rod is drawn backwards, thereby compressing the spring 32, and turned with reference to barrel 10 until the key 29 strikes the stops 28, at which time it will register with the slot. Then when the rod is pushed forwardly, the key passes through the slot and permits the handle 16 to be forced to its extreme forward position without advancing the follower. The follower will thus be left in the same position in the cylinder until the gun is used again, at which time the plunger rod may be locked to the piston by reversing the foregoing operation.

I thus provide an inexpensive but efficient lock for operatively connecting and disconnecting a plunger rod from its piston by a partial rotation of the rod. This permits the rod to be moved to its innermost position, regardless of the position of the piston and the lubricant in the cylinder. The parts are thus compactly arranged to store the gun upon a dispensing rack without discharging unused lubricant from the gun.

I claim:

In a lubricant dispensing device, the combination with a lubricant chamber, of a piston slidable longitudinally therein, said piston comprising a member having a centrally arranged passageway extending therethrough, the passageway being enlarged adjacent the forward end of the chamber and having an intermediate shoulder, a rod extending through the passageway and terminating in a handle outside the member, the member having a pair of oppositely facing packing cups carried thereby, a nut for locking the cups against the shoulder, packing means embracing the rod at the rearward end of the member, a spring disposed within the enlarged portion of said member and also embracing the rod, a cup threaded to the member, and having a transversely extending slot therein, a key fixed to the rod adjacent the forward end thereof and insertable through the slot in the cup, the key being adapted to engage the spring when the rod is withdrawn into the cap, and inwardly disposed shoulders on the cap for holding the key in engagement with the cap under the force of said spring.

WALTER V. HALL.